United States Patent Office 3,767,626
Patented Oct. 23, 1973

3,767,626
PREPOLYMERS AND HEAT-RESISTANT RESINS DERIVED THEREOF
Serge Laurent, Bron, and Maurice Mallet, Lyon, France, assignors to Rhone-Poulenc S.A., Paris, France
No Drawing. Filed Dec. 17, 1969, Ser. No. 885,957
Claims priority, application France, Dec. 19, 1968, 179,313
Int. Cl. C08g 20/00
U.S. Cl. 260—78 UA                                  5 Claims

ABSTRACT OF THE DISCLOSURE

Prepolymers useful in preparing moulded articles, are produced by mixing and heating an unsaturated N,N'-bis-imide, a diprimary diamine, and trimellitic anhydride. Compositions are produced by mixing the prepolymers with one or more fillers or pigments.

---

The present invention provides prepolymers which, on moulding, yield heat-resistant articles which are very easily removable from the mould.

According to the present invention there are provided prepolymers obtained by mixing and heating an N,N'-bisimide of the general formula:

$$Z\underset{CO}{\overset{CO}{\diagup\!\!\diagdown}}N-T-N\underset{CO}{\overset{CO}{\diagup\!\!\diagdown}}Z$$

in which Z represents a divalent radical containing a carbon-carbon double bond and T is a divalent radical possessing at least 2 carbon atoms, a diprimary diamine of the general formula:

$$H_2N-Q-NH_2$$

in which Q represents a divalent radical which possesses 2 to 30 carbon atoms, and 0.5 to 10% by weight of trimellitic anhydride, based on the weight of the mixture of bis-imide and diamine, at 100–250° C.

The symbols T and Q used herein may be identical or different and may represent a linear or branched alkylene radical of less than 13 carbon atoms, a cycloalkylene radical with 5 or 6 ring carbon atoms, a heterocyclic radical containing, as hetero-atom, at least one of O, N and S, or a phenylene or aromatic polycyclic radical; these various radicals may furthermore carry substituents which do not result in the side-reactions under the working conditions. The symbols T and Q may also comprise several phenylene radicals or divalent alicyclic radicals linked directly with divalent atoms or groups, for example, oxygen or sulphur atoms, alkylene groups of 1 to 3 carbon atoms, $$-NR_4-, \; -P(O)R_3-, \; -N=N-, \; -\overset{\downarrow}{\underset{O}{N=N}}-, \; -CO-O-, \; -SO_2-,$$

$$-SiR_3R_4-, \; -CONH-, \; -NY-CO-X-CO-NY-,$$

and $$-O-CO-X-CO-O-, \;\; \bigcirc\!\!-\!\!\bigcirc, \;\; \bigcirc\!\!-\!\!\overset{-CH-}{\underset{}{}}\!\!-\!\!\bigcirc, \;\; \text{and} \;\; \bigcirc\!\!-\!\!\overset{R_3}{\underset{-\overset{|}{C}-}{}}\!\!-\!\!$$

in which $R_3$, $R_4$ and Y represent an alkyl radical of 1 to 4 carbon atoms or a cycloalkyl radical with 5 or 6 ring carbon atoms or a benzene or aromatic polycyclic radical, and X represents a linear or branched alkylene radical of less than 13 carbon atoms, a cycloalkylene radical with 5 or 6 ring carbon atoms or a monocyclic or polycyclic arylene radical.

The radical Z is derived from an ethylenic anhydride of the general formula:

$$Z\underset{CO}{\overset{CO}{\diagup\!\!\diagdown}}O$$

which can be, for example, maleic anhydride, citraconic anhydride, tetrahydrophthalic anhydride, itaconic anhydride as well as the Diels-Alder reaction products of a cyclodiene and one of these anhydrides.

Among the N,N'-bis-imides which may be used, there may be mentioned

N,N'-ethylene-bis-maleimide,
N,N'-hexamethylene-bis-maleimide,
N,N'-m-phenylene-bis-maleimide,
N,N'-p-phenylene-bis-maleimide,
N,N'-4,4'-diphenylmethane-bis-maleimide,
N,N'-4,4'-diphenylether-bis-maleimide,
N,N'-4,4'-diphenyl-sulphone-bis-maleimide,
N,N'-4,4'-dicyclohexylmethane-bis-maleimide,
N,N'-α,α'-4,4'-dimethylene-cyclohexane-bis-maleimide,
N,N'-m-xylylene-bis-maleimide, and
N,N'-4,4-diphenylcyclohexane-bis-maleimide.

Among the diprimary diamines which may be used, there may be mentioned 4,4'-diamino-dicyclohexylmethane,
1,4-diaminocyclohexane,
2,6-diamino-pyridine,
m-phenylenediamine,
p-phenylene diamine,
4,4'-diamino-diphenylmethane,
2,2-bis(4-aminophenyl)-propane,
benzidine,
4,4'-diaminodiphenyl ether,
4,4'-diaminodiphenyl sulphide,
4,4'-diaminodiphenyl sulphone,
bis-(4-aminophenyl)diphenylsilane,
bis(4-aminophenyl)methylphosphine oxide,
bis(3-aminophenyl)methylphosphine oxide,
bis(4-aminophenyl) phenylphosphine oxide,
bis(4-aminophenyl)phenylamine,
1,5-diamino-naphthalene,
m-xylylenediamine, p-xylylenediamine,
1,1-bis(p-aminophenyl)-phthalane and
hexamethylenediamine.

The amounts of N,N'-bis-imide and diamine are chosen so that the ratio $$\frac{\text{No. of mols of N,N'-bis-imide}}{\text{No. of mols of diamine}}$$

is greater than 1 and preferably between 1.2 and 50.

Preferably, the reaction product of N,N'-4,4'-diphenylmethane-bis-maleimide with 4,4'-diamino-diphenylmethane, in a ratio of imide/diamine of between 1.3 and 5, is used in the invention.

The preparation of the prepolymer may be carried out in bulk or in solution; in the latter case, an inert polar diluent such as dimethylformamide, N-methylpyrrolid-2-one or dimethylacetamide is used as the solvent medium. The prepolymer is obtained by heating the reagents for several minutes to several hours at a temperature of between 100 and 250° C.

Various fillers may be mixed with the prepolymer to improve the mechanical properties or heat resistance of the moulded articles or to impart certain advantageous properties to them, such as abrasiveness or electrical conductivity.

It is also possible to mix other additives such as pigments with the prepolymer.

Heat-resistant moulded articles which are very easily removable from the mould may be obtained by placing in the mould the prepolymer or a mixture of the prepolymer and one or more fillers or additives, then heating the mould until the prepolymer has completely hardened.

The moulding is generally carried out under a pressure of 50 to 500 bars and at a temperature of between 200 and 350° C.

The prepolymers according to the invention can be converted into articles of the most varied shapes and sizes by moulding. They are particularly suitable for the manufacture of small articles which can be removed from the mould without any difficulty.

The following example illustrates the invention.

EXAMPLE 321 g. of N,N'-4,4'-diphenylmethane-bis-maleimide, 71 g. of bis-(aminophenyl)methane and some trimellitic anhydride were introduced into a vessel.

The mixture was heated to 165° C. for 45 minutes to yield a prepolymer.

The prepolymer was thereafter introduced into a cylindrical polished steel mould of internal diameter 15 mm. and 32 mm. height, the bottom of this mould being removable.

Moulding was carried out under a pressure of 150 bars for 1 hour at 250° C.

The following table indicates the force required to eject the article from its seat in the mould and the ejection pressure, for trimellitic anhydride contents ranging from 1 to 5%, based on the weight of the mixture of bis-maleimide and diamine.

| Anhydride content in percent | Ejection force in kg. | Ejection pressure in bars |
|---|---|---|
| 1 | 550 | 36 |
| 2 | 450 | 30 |
| 5 | 150 | 10 |

We claim:
1. A prepolymer obtained by heating a N,N'-bis-imide of the formula:

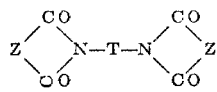

in which Z represents a divalent ethylenically unsaturated aliphatic hydrocarbon radical and T is an arylene radical or several arylene radicals connected to one another either directly or by intermediate inert divalent atoms or groups, a diprimary diamine of the formula:

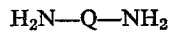

in which Q represents an arylene radical or several arylene radicals connected to one another either directly or by intermediate inert divalent atoms or groups, the ratio of the number of mols of N,N'-bis-imide to the number of mols of diamine being from 1.2 to 50, and 0.5 to 10% by weight of trimellitic anhydride, based on the weight of the mixture of bis-imide and diamine, at 100–250 °C.

2. Prepolymer according to claim 1, in which the bis-imide is N,N'-4,4'-diphenylmethane-bis-maleimide and the diamine is 4,4'-diaminodiphenylmethane.

3. Prepolymer according to claim 2, in which the ratio of the number of mols of imide to the number of mols of diamine is from 1.3 to 5.

4. A moulded article made by heating at a temperature from 200° to 350° C. in a mold, a prepolymer according to claim 1.

5. A moulded article according to claim 4 in which the prepolymer is heated under a pressure from 50 to 500 bars.

References Cited

UNITED STATES PATENTS

| 2,818,405 | 12/1957 | Kovacic | 260—78 VA |
| 3,380,964 | 4/1968 | Grundschober et al. | 260—78 VA |
| 3,406,148 | 10/1968 | Sambeth et al. | 260—78 VA |
| 3,533,996 | 10/1970 | Grundschober et al. | 260—78 VA |

HAROLD D. ANDERSON, Primary Examiner

U.S. Cl. X.R.

260—47 CZ, 47 UA, 47 CD, 78 TF